United States Patent
Vandiver et al.

(10) Patent No.: US 8,782,364 B2
(45) Date of Patent: Jul. 15, 2014

(54) DETERMINING AVAILABILITY OF DATA ELEMENTS IN A STORAGE SYSTEM

(75) Inventors: Benjamin Mead Vandiver, Arlington, MA (US); Lyric Pankaj Doshi, Cambridge, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 184 days.

(21) Appl. No.: 13/324,830

(22) Filed: Dec. 13, 2011

(65) Prior Publication Data

US 2013/0151773 A1 Jun. 13, 2013

(51) Int. Cl.
*G06F 12/00* (2006.01)

(52) U.S. Cl.
USPC .................. 711/162; 707/999.201

(58) Field of Classification Search
USPC .................. 711/162; 707/999.201
See application file for complete search history.

(56) References Cited

U.S. PATENT DOCUMENTS

| | | | | |
|---|---|---|---|---|
| 5,566,349 A | * | 10/1996 | Trout | 710/20 |
| 6,055,639 A | * | 4/2000 | Schanze | 726/10 |
| 7,299,325 B1 | * | 11/2007 | Waterhouse et al. | 711/159 |
| 7,506,011 B2 | | 3/2009 | Liu et al. | |
| 7,778,183 B2 | | 8/2010 | Fan et al. | |
| 2009/0161681 A1 | * | 6/2009 | Madrahalli et al. | 370/401 |
| 2009/0327364 A1 | | 12/2009 | Schwab et al. | |
| 2010/0199042 A1 | | 8/2010 | Bates et al. | |
| 2011/0167226 A1 | * | 7/2011 | Pong | 711/147 |
| 2012/0047165 A1 | * | 2/2012 | Rugg et al. | 707/769 |
| 2012/0109936 A1 | * | 5/2012 | Zhang et al. | 707/713 |
| 2012/0254565 A1 | * | 10/2012 | Mitra et al. | 711/161 |

OTHER PUBLICATIONS

Bonvin, N. et al., A Self-organized, Fault-tolerant and Scalable Replication Scheme . . . , Jun. 2010,http://infoscience.epfl.ch/record/146774/files/socc048-bonvin.pdf,pp. 205-216.
Zhang, Y. et al.,Balancing the Tradeoffs Between Query Delay and Data Availability in MANETs, Aug. 30, 2011, http://mcn.cse.psu.edu/paper/yangzhan/zhang-tpds11.pdf , pp. 1-9.
Dhruba Borthakur, HDFS Architecture Guide, 2008, http://hadoop.apache.org/common/docs/current/hdfs_design.pdf.

* cited by examiner

*Primary Examiner* — Hashem Farrokh

(57) ABSTRACT

Data elements are stored at a plurality of nodes. Each data element is a member data element of one of a plurality of layouts. Each layout indicates a unique subset of nodes. All member data elements of the layout are stored on each node in the unique subset of nodes. A stored dependency list includes every layout that has member data elements. The dependency list is used to determine availability of data elements based on ability to access data from nodes from the plurality of nodes.

13 Claims, 2 Drawing Sheets

DETERMINING AVAILABILITY OF DATA ELEMENTS IN A STORAGE SYSTEM

BACKGROUND

Storage systems, such as those for cloud storage, can store data in a cluster of multiple nodes. A node is, for example, a client, a server, a peer or some other networked entity on which data is stored and which is accessible through a network. Nodes may at times be unavailable for access from a network, for example because of maintenance of the node or network or some sort of failure in the node or network. The failure may be a hardware or software failure and may be caused, for example, by a power failure, overheating, rack failure, hard drive failure, network wiring or protocol failure, etc.

Data stored in the storage system may include data elements. A data element is any unit of data defined for processing. Typically, a data element may include one or more fields of data, depending on how the data element has been defined within a storage system.

Because nodes may become temporarily or permanently unavailable to a network, duplicate copies of data elements are often stored on multiple nodes within a storage system. For example, data elements may be fully replicated on every node of a storage system. In such a case, as long as a single node in the storage system is accessible, all the data elements are accessible.

In other storage systems, data elements may only be partially replicated. In partially replicated storage systems, data elements are replicated on more than one node of the storage system, but they are not replicated on all of the nodes of the storage system. When one or more nodes of a partially replicated storage system become unavailable, a data element may or may not become unavailable depending on the identity of the node or nodes that become unavailable and the identity of the node or nodes on which the data element is stored.

DETAILED DESCRIPTION

Within a storage system, data elements are stored on nodes. Each data element may be replicated on one or more nodes. When two data elements are replicated on exactly the same nodes, they are said to be member data elements of the same layout. Specifically, a layout identifies a unique subset of nodes. In order to be a member data element of a layout, a data element is stored, and only stored, on each node in the unique subset of nodes identified by the layout.

A dependency list starts as a compilation of the layouts within the storage system. That is, the dependency list identifies the unique set of nodes for each layout; however, the dependency list can be modified or operated upon to reflect, in real time or near real time, the status of nodes. When one or more nodes become unavailable, the dependency list can be modified or operated upon to indicate which nodes are no longer accessible on the network. From the dependency list, in real time or near real time, it is possible, therefore, to determine when no nodes identified by the layout are accessible. When no nodes identified by a layout are accessible, member data elements of the layout are not available to be accessed from the storage system. If at least one node identified by a layout is accessible, member data elements of the layout are available to be accessed from the storage system.

The use of a dependency list that is a compilation of layouts allows for compact storage of data element status information that can be efficiently used to determine availability of data elements when some of the nodes within the storage system become unavailable.

Figure 1:
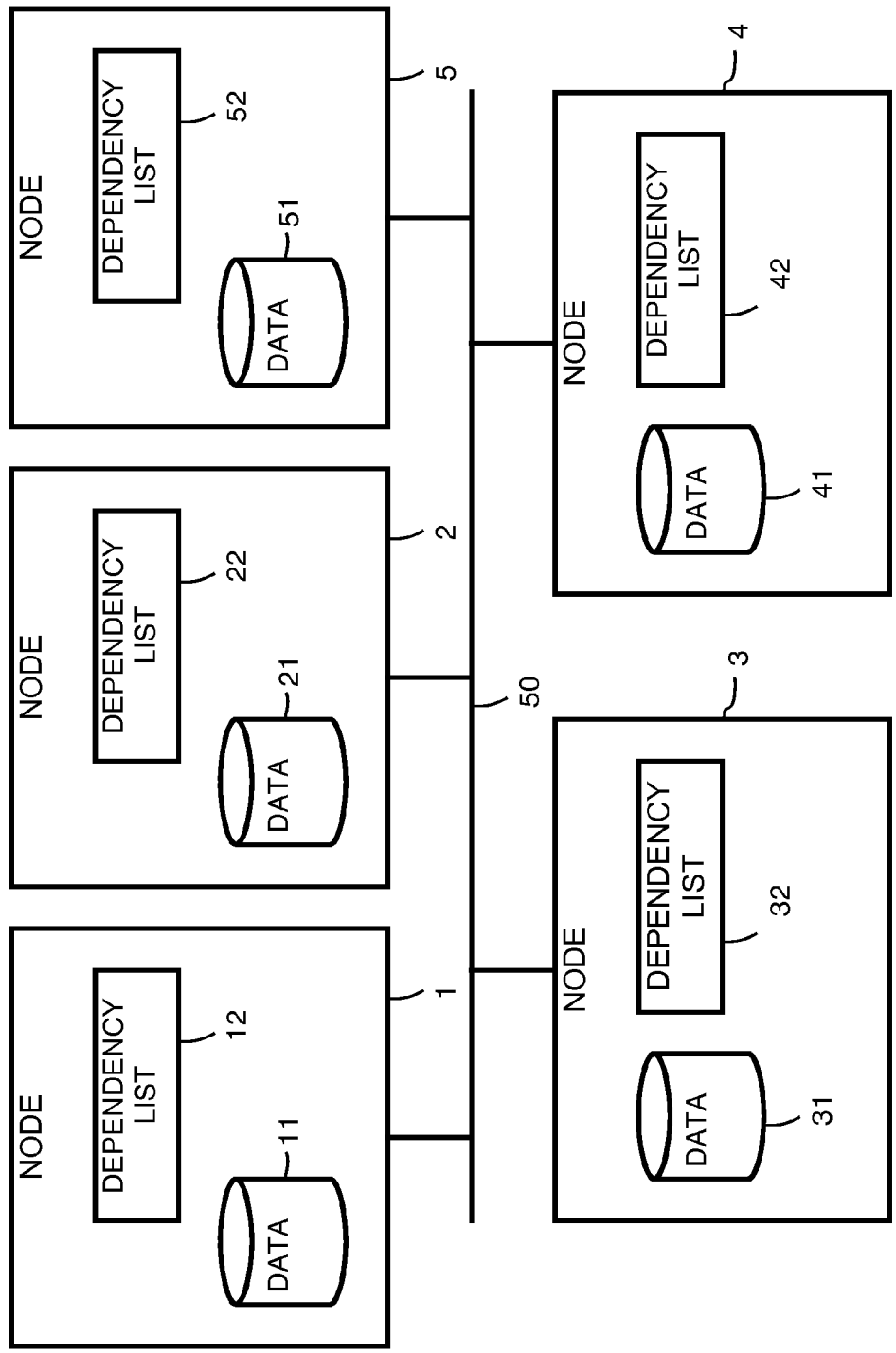
FIG. 1 is a simplified block diagram showing nodes connected to a network, each node including a dependency list in accordance with an implementation.

For example, FIG. 1 shows five nodes, a node 1, a node 2, a node 3, a node 4 and a node 5, connected to a network 50. At nodes 1, 2, 3, 4, and 5, data elements are stored in data storage 11, data storage 21, data storage 31, data storage 41, and data storage 51, respectively. The node cluster that includes nodes 1 through 5 function together as a storage system. The illustrated number and arrangement of nodes is only exemplary, and it should be understood that a storage system can include any appropriate number or arrangement of nodes.

Each data element is stored in one or more nodes in accordance with a layout that identifies the one or more nodes in which the data element is stored. A dependency list 12, a dependency list 22, a dependency list 32, a dependency list 42 and a dependency list 52 may each indicate which nodes are identified by each layout. While FIG. 1 shows a dependency list stored on each node, in other implementations a dependency list may be stored on only some of the nodes, or may be stored on none of the nodes but in a separate location.

For example, table 1 below shows on which nodes eleven data elements (E1-E11) are stored:

TABLE 1

| Node 1 | Node 2 | Node 3 | Node 4 | Node 5 |
|--------|--------|--------|--------|--------|
| E1     | E1     | E2     | E3     | E4     |
| E5     | E2     | E3     | E4     | E5     |
| E6     | E6     | E7     | E8     | E9     |
| E10    | E7     | E8     | E9     | E10    |
| E11    | E11    | E11    | E11    | E11    |

As shown in table 1, data element E1 and data element E6 are both stored and only stored on node 1 and node 2. Therefore, data elements E1 and E6 are both member elements of a first layout that identifies node 1 and node 2. Data element E2 and data element E7 are both stored and only stored on node 2 and node 3. Therefore, data elements E2 and E7 are both member elements of a second layout that identifies node 2 and node 3. Data element E3 and data element E8 are both stored and only stored on node 3 and node 5. Therefore, data elements E3 and E8 are both member elements of a third layout that identifies node 4 and node 5. Data element E4 and data element E9 are both stored and only stored on node 4 and node 5. Therefore, data elements E4 and E9 are both member elements of a fourth layout that identifies node 4 and node 5. Data element E5 and data element E10 are both stored and only stored on node 1 and node 5. Therefore, data elements E5 and E10 are both member elements of a fifth layout that identifies node 1 and node 5. Data element E11 is stored on nodes 1 through 5. Therefore, data element E11 is a member element of a sixth layout that identifies node 1 through 5. Thus in the example given in Table 2, each of the eleven data elements is stored in one of six layouts.

An example of a dependency list for data elements listed in Table 1 is set out in Table 2 below:

TABLE 2

| | | | | |
|---|---|---|---|---|
| 1 | 1 | 0 | 0 | 0 |
| 0 | 1 | 1 | 0 | 0 |
| 0 | 0 | 1 | 1 | 0 |
| 0 | 0 | 0 | 1 | 1 |
| 1 | 0 | 0 | 0 | 1 |
| 1 | 1 | 1 | 1 | 1 |

In Table 2, each column represents a node and each row represents a layout. The first (leftmost) column represents node 1. The second column represents node 2. And so on. The first (uppermost) row represents the first layout. The second row represents the second layout. And so on.

In each row, a "1" represents a node identified by a layout. Thus, in the first row there is a "1" in the first column and in the second column, indicating the first layout identifies the first node and the second node. In the second row there is a 1 in the second column and in the third column, indicating the second layout identifies the second node and the third node.

While in table 1, a "1" (or logic 1) represents a node identified by a layout, this is just exemplary. Any system of logic values can be used to represent node status. For example, instead of a "1" representing a node identified by a layout and a "0" (or logic 0) representing a node not identified by a layout, table 1 could be adjusted by using a "0" to represent a node identified by a layout and a "1" to represent a node not identified by a layout. Alternately, any other appropriate logic values can be used as long as they allow two states to be represented. The dependency list shown in Table 2 can be stored in the form of a bitset of 30 bits. Boolean operations can be performed on the bitset to determine which data elements are available when one or more data nodes becomes unavailable. For example, a logical AND can be performed between each entry in the column for a node and a status bit for the node, where the status bit is a "0" if the node is unavailable and the status bit is a "1" if the node is available.

For the example shown in Table 2, suppose node 1 and 3 become unavailable. As a result, the status bit for column 1 and the status bit for column 3 are both set to 0. The status bits for columns 2, 4 and 5 remain set to 1, since nodes 2, 4 and 5 are available. A logical AND performed between each entry in the dependency list shown in table 2 and the status bit for its column results in the bitset shown in Table 3 below:

TABLE 3

| | | | | |
|---|---|---|---|---|
| 0 | 1 | 0 | 0 | 0 |
| 0 | 1 | 0 | 0 | 0 |
| 0 | 0 | 0 | 1 | 0 |
| 0 | 0 | 0 | 1 | 1 |
| 0 | 0 | 0 | 0 | 1 |
| 0 | 1 | 0 | 1 | 1 |

In Table 3, there is still at least one entry set to 1 in every row; therefore, all eleven data elements are available and accessible. This can be determined using Boolean logic, for example, by performing a logical OR across the entries in each row. If the result of performing the logical OR for a row is 1, then member data elements for the layout represented by the row are available and accessible in the storage system.

For the example shown in Table 2, suppose node 4 and 5 become unavailable. In this case the status bit for column 4 and the status bit for column 5 are set to 0. The status bits for columns 1, 2 and 3 remain set to 1 since nodes 1, 2 and 3 are available. A logical AND performed between each entry in the dependency list shown in table 2 and the status bit for its column results in the bitset shown in Table 4 below:

TABLE 4

| | | | | |
|---|---|---|---|---|
| 1 | 1 | 0 | 0 | 0 |
| 0 | 1 | 1 | 0 | 0 |
| 0 | 0 | 1 | 0 | 0 |
| 0 | 0 | 0 | 0 | 0 |
| 1 | 0 | 0 | 0 | 0 |
| 1 | 1 | 1 | 0 | 0 |

Since there is no bit set to "1" in row four, the member data elements represented by the fourth layout are not available for access. That is, data elements E4 and E9 are unavailable for access since data elements E4 and E9 are both member elements of the fourth layout.

In the above simplified example, an implementation is described for five nodes and eleven data elements in a data system; however, storage systems can be of any appropriate size. For example there might be hundreds or thousands of nodes and billions of data elements in a storage system. In such a case, data elements are typically placed as member data elements within a layout in accordance with a particular placement policy.

For example, data elements may be placed in a layout in accordance with a placement policy based on a hashing function. Each segment of a hash domain can be stored in a set of nodes identified by a layout associated with the segment of the hash domain. The number of layouts used, therefore, is based on the number of segments within the hash domain.

For example, where there are 128 hash domains, a hashing operation performed on all or a portion of a data element will produce one of 128 possible hashing values. The hashing value determines which layout data elements will be stored on particular nodes. All data elements that produce the same hashing value will be member data elements of the same layout. When there are 128 hash domains there are, for example, 128 layouts.

In order to assist modification of the dependency list when layouts are added to the storage system or are no longer utilized, a count can be kept of the number of data elements that utilize each layout in the dependency list. When a layout is no longer used, the layout can be removed from the dependency list.

In the example given in table 1 and table 2, the first layout has two member data elements (E1 and E6), the second layout has two member data elements (E2 and E7), the third layout has two member data elements (E3 and E8), the fourth layout has two member data elements (E4 and E9), the fifth layout has two member data elements (E5 and E10), and the sixth layout has one member data element (E11). This can be represented as set out in table 5 below:

TABLE 5

| | | | | | |
|---|---|---|---|---|---|
| 1 | 1 | 0 | 0 | 0 | (2) |
| 0 | 1 | 1 | 0 | 0 | (2) |
| 0 | 0 | 1 | 1 | 0 | (2) |
| 0 | 0 | 0 | 1 | 1 | (2) |
| 1 | 0 | 0 | 0 | 1 | (2) |
| 1 | 1 | 1 | 1 | 1 | (1) |

Now suppose data elements E10 and E11 are removed from the storage system. Data element E10 is a member data element of the fifth layout, so removing data element E10 from the storage system results in a decrement in count for the fifth layout. Data element E11 is a member data element of the sixth layout, so removing data element from the storage system results in a decrement in count for the sixth layout. Decrementing the count for the sixth layout results in a count of zero for the sixth layout so the sixth layout may be removed from the dependency list. The result is shown in Table 6 below:

TABLE 6

| 1 | 1 | 0 | 0 | 0 | (2) |
|---|---|---|---|---|-----|
| 0 | 1 | 1 | 0 | 0 | (2) |
| 0 | 0 | 1 | 1 | 0 | (2) |
| 0 | 0 | 0 | 1 | 1 | (2) |
| 1 | 0 | 0 | 0 | 1 | (1) |

Suppose two new data elements, E12 and E13, are added to storage each being stored in a seventh layout identifying the first, the second and the third node. As a result the dependency list shown in Table 6 would be modified as shown in Table 7 below:

TABLE 7

| 1 | 1 | 0 | 0 | 0 | (2) |
|---|---|---|---|---|-----|
| 0 | 1 | 1 | 0 | 0 | (2) |
| 0 | 0 | 1 | 1 | 0 | (2) |
| 0 | 0 | 0 | 1 | 1 | (2) |
| 1 | 0 | 0 | 0 | 1 | (1) |
| 1 | 1 | 1 | 0 | 0 | (2) |

While the above example describes keeping a count of each storage element, other counts may be kept instead. For example, data elements are typically stored in tables of data elements. Data elements in each table can be segmented based on a placement policy such as those that use a hashing function. In such a case, there may be a limited number of layouts used for each table based on the number of segments in the placement policy for the table. The dependency list can include a count for the number of tables that use each layout. As tables are added to and removed from the storage system, the count for each layout can be adjusted. The adjustment may be accomplished by incrementing the count for every layout used by a newly added table and by decrementing the count for every layout used by a newly removed table. When a table is added to the system where the table uses a layout not yet in the dependency list, the layout may be added to the dependency list. When there are no longer any tables that utilize a layout in the dependency list, the layout may be removed from the dependency list.

Figure 2:
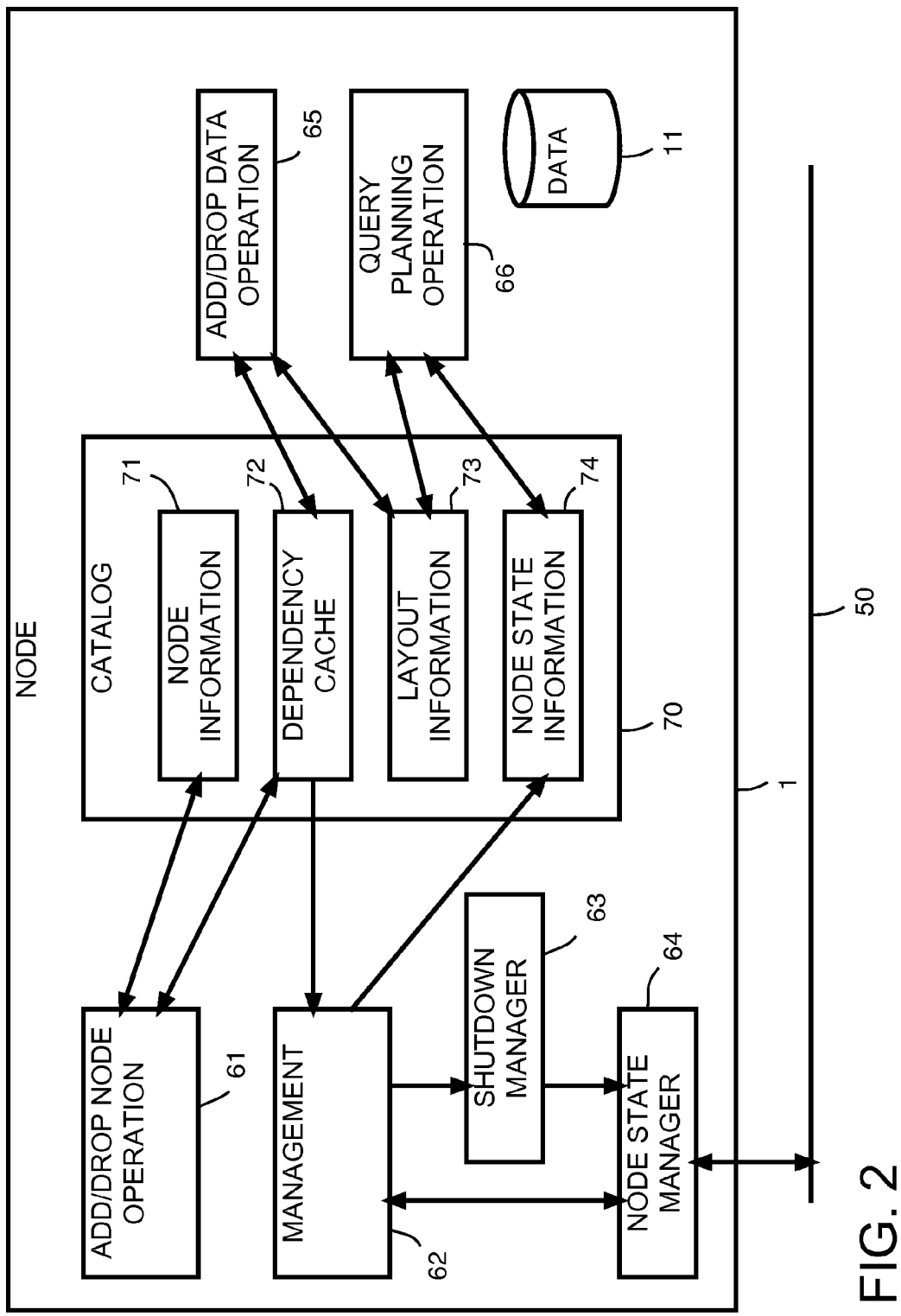
FIG. 2 is a simplified block diagram showing additional details of a node shown in FIG. 1, in accordance with an implementation.

FIG. 2 is a simplified block diagram providing more details of an example implementation of node 1. A catalog 12 stores information about nodes within the storage system. A node information block 71 stores information about nodes within the storage system. A node state block 74 stores information about the current state of nodes within the storage system. A layout information block 73 stores information about the layout of data within the storage system. A dependency cache 72 is cache memory that stores dependency list 12.

Various management blocks are utilized to update the information in catalog 70 as nodes are added and dropped from the storage system shown in FIG. 1 and as data elements are added and removed from the nodes. For example, based on information obtained over network 50, a management block 62 keeps current node state information within node state information block 74. For example, management block 62 performs the Boolean logic on dependency list 12 within dependency cache 72 to determine whether requested data elements are available in the storage system. An add/drop node operation block 61 updates node information block and dependency list 12 within dependency cache 72 when nodes are added or dropped from the storage system. An add/drop data operation block 65 updates layout information block 73 and dependency list 12 within dependency cache 72 when data is added or dropped from the storage system.

A node state manager 64 within node 1 provides an interface to network 50. A query planning operation block 66 determines how queries for data information are handled within node 1. A shutdown manager 63 controls shutdown of node 1.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the following claims.

We claim:

1. A storage system comprising:
   a plurality of nodes;
   a plurality of data elements stored on the plurality of nodes, wherein each data element is a member data element of one of a plurality of layouts, each layout in the plurality of layouts indicating a unique subset of nodes from the plurality of nodes,
      wherein for each layout in the plurality of layouts, all member data elements of the layout are stored on each node in the unique subset of nodes indicated by the layout and are not stored on any other node in the plurality of nodes so that whenever there is more than one node in the unique subset of nodes indicated by the layout, all member data elements of the layout are replicated on all nodes in the unique subset of nodes indicated by the layout; and,
   a dependency list that includes every layout that has member data elements, the dependency list being used to determine availability of data elements based on ability to access nodes from the plurality of nodes;
   wherein the dependency list is a bitset and wherein within each layout, each node is represented by a bit; and,
   wherein when a first node becomes unavailable a Boolean operation is performed to indicate that within every layout no data on the first node is available.

2. A storage system as in claim 1 wherein the dependency list is stored in a cache memory.

3. A storage system as in claim 1 wherein the dependency list is a bitset, and wherein within each layout, each node is represented by a bit.

4. A storage system as in claim 1:
   wherein each node indicated by the layout is represented by the bit being in a first state; and,
   wherein when the first node becomes unavailable the bit indicating the first node is placed in a second state, the second state being different than the first state.

5. A storage system as in claim 4:
   wherein the first state is a logic one and the second state is a logic zero.

6. A storage system as in claim 1 wherein the data elements are associated with layouts in accordance with a placement policy based on a hashing function.

7. A method for determining availability of data elements in a storage system comprising:
   storing data elements in a plurality of nodes so that each data element is a member data element of one of a plurality of layouts, each layout in the plurality of layouts indicating a unique subset of nodes from the plurality of nodes, wherein for each layout in the plurality of layouts all member data elements of the layout are stored on each node in the unique subset of nodes indicated by the layout and are not stored on any other node in the plurality of nodes so that whenever there is more than one node in the unique subset of nodes indicated by the layout, all member data elements of the layout are replicated on all nodes in the unique subset of nodes indicated by the layout;

storing a dependency list that includes every layout that has member data elements;

using the dependency list to determine availability of data elements based on ability to access data from nodes from the plurality of nodes; and, storing, for each layout, a count of all tables of data elements that utilize the layout.

8. A method as in claim 7 wherein storing the dependency list includes storing, for each layout, an entry for each node, the entry being at a first logic value when the layout indicates the node and the entry being at a second logic value when the layout does not indicate the node.

9. A method as in claim 7 additionally comprising:

adding a new table of data elements to the storage system, wherein adding the new table includes incrementing, for each layout used by the new table, the count of all tables of data elements that use the layout.

10. A method as in claim 7 additionally comprising:

removing a table of data elements from the storage system, wherein removing the table includes decrementing, for each layout used by the removed table, the count of all tables of data elements that use the layout.

11. A method as in claim 10 additionally comprising:

removing a first layout from the dependency list when a count of all tables of data elements that use the first layout is zero.

12. A node of a storage system comprising:

a plurality of data elements stored on the node, wherein each data element is a member data element of one of a plurality of layouts, each layout in the plurality of layouts indicating a unique subset of nodes of the storage system, all member data elements of the layout being stored and only stored on each node in the unique subset of nodes so that whenever there is more than one node in the unique subset of nodes, all member data elements of the layout are replicated on all nodes in the unique subset of nodes;

a dependency list that includes every layout that has member data elements, the dependency list being used to determine availability of data elements based on ability to access nodes of the storage system; and a count of all tables of data elements that utilize each layout so that adding a new table of data elements to the storage system includes incrementing, for each layout used by the new table, the count of all tables of data elements that use the layout.

13. A node as in claim 12, additionally comprising:

a catalog that stores information about the nodes of the storage system, the information including state information about the nodes, the catalog storing the dependency list within a cache memory; and, management blocks, the management blocks updating the information in the catalog as nodes are added and dropped from the storage system and as data elements are added and removed from the nodes.

* * * * *